(12) United States Patent
Matsuo et al.

(10) Patent No.: US 8,605,609 B2
(45) Date of Patent: Dec. 10, 2013

(54) SIMULATION OF MULTIPLE NODES IN AN INTERNETWORK

(75) Inventors: Brian Matsuo, Mountain View, CA (US); Wilson Chuen Yew Yeung, Campbell, CA (US); Daniel McKernan, Cupertino, CA (US)

(73) Assignee: Silver Spring Networks, Inc., Redwood City, CA (US)

( * ) Notice: Subject to any disclaimer, the term of this patent is extended or adjusted under 35 U.S.C. 154(b) by 362 days.

(21) Appl. No.: 12/722,144

(22) Filed: Mar. 11, 2010

(65) Prior Publication Data

US 2011/0222407 A1   Sep. 15, 2011

(51) Int. Cl.
H04L 12/24 (2006.01)

(52) U.S. Cl.
USPC .......................................................... 370/252

(58) Field of Classification Search
USPC .......................................... 370/241; 709/226
See application file for complete search history.

(56) References Cited

U.S. PATENT DOCUMENTS

| | | | | |
|---|---|---|---|---|
| 4,707,852 A * | 11/1987 | Jahr et al. | ................. | 379/106.03 |
| 5,495,239 A * | 2/1996 | Ouellette | ................ | 340/870.02 |
| 5,900,824 A * | 5/1999 | Hayashi | ................... | 340/870.11 |
| 6,150,955 A * | 11/2000 | Tracy et al. | ............. | 340/870.02 |
| 6,363,335 B1 * | 3/2002 | Monroe et al. | ................. | 703/21 |
| 6,754,701 B1 * | 6/2004 | Kessner | ........................ | 709/219 |
| 6,799,213 B1 * | 9/2004 | Zhao et al. | .................... | 709/224 |
| 7,064,679 B2 * | 6/2006 | Ehrke et al. | ............. | 340/870.02 |
| 7,277,027 B2 * | 10/2007 | Ehrke et al. | ............. | 340/870.12 |
| 7,304,587 B2 * | 12/2007 | Boaz | ........................ | 340/870.02 |
| 7,743,151 B2 * | 6/2010 | Vallapureddy et al. | ........ | 709/227 |
| 7,769,888 B2 * | 8/2010 | Flammer et al. | ............... | 709/238 |
| 7,797,009 B2 * | 9/2010 | Kiiskila et al. | .................. | 455/519 |
| 7,802,000 B1 * | 9/2010 | Huang et al. | .................. | 709/228 |
| 7,885,917 B2 * | 2/2011 | Kuhns et al. | ..................... | 706/48 |
| 7,890,613 B2 * | 2/2011 | Tameshige et al. | ........... | 709/220 |
| 7,953,865 B1 * | 5/2011 | Miller et al. | ................... | 709/227 |
| 7,962,101 B2 * | 6/2011 | Vaswani et al. | ............. | 455/67.11 |
| 8,019,837 B2 * | 9/2011 | Kannan et al. | ................. | 709/220 |
| 8,028,071 B1 * | 9/2011 | Mahalingam et al. | ........ | 709/227 |
| 8,072,951 B2 * | 12/2011 | Flammer et al. | .............. | 370/338 |
| 8,130,700 B2 * | 3/2012 | Flammer et al. | .............. | 370/328 |
| 8,144,027 B2 * | 3/2012 | Goldberg et al. | ........ | 340/870.02 |
| 8,295,308 B2 * | 10/2012 | Iyengar | ......................... | 370/473 |
| 8,301,761 B2 * | 10/2012 | Bucknell | ....................... | 709/224 |
| 8,311,032 B2 * | 11/2012 | Smith et al. | .................... | 370/351 |
| 2004/0061625 A1 * | 4/2004 | Ehrke et al. | ............. | 340/870.02 |
| 2004/0066310 A1 * | 4/2004 | Ehrke et al. | ............. | 340/870.02 |
| 2004/0070517 A1 * | 4/2004 | Ehrke et al. | ............. | 340/870.02 |
| 2007/0013547 A1 * | 1/2007 | Boaz | ........................ | 340/870.02 |
| 2007/0127393 A1 * | 6/2007 | Car | ................................ | 370/254 |
| 2008/0189415 A1 * | 8/2008 | Vaswani et al. | ............... | 709/226 |
| 2008/0244525 A1 * | 10/2008 | Khalil et al. | ................ | 717/124 |

(Continued)

*Primary Examiner* — Ricky Ngo
*Assistant Examiner* — Ben H Liu
(74) *Attorney, Agent, or Firm* — Buchanan Ingersoll & Rooney PC

(57) ABSTRACT

A method is provided for simulation of multiple network nodes in an internetwork. A range of a plurality of network addresses are assigned to a simulation node. The simulation node monitors network communications to listen for packets. Upon receipt of a packet having a destination address within the assigned range, a command is forwarded to an end-use application, such as firmware. The end-use application processes the command and returns a result. A response packet having the result is transmitted to the back office server with the destination address of the received packet as the source of the response packet.

20 Claims, 6 Drawing Sheets

(56) References Cited

U.S. PATENT DOCUMENTS

| | | | |
|---|---|---|---|
| 2009/0003243 A1* | 1/2009 | Vaswani et al. | 370/255 |
| 2009/0307178 A1* | 12/2009 | Kuhns et al. | 706/54 |
| 2010/0125667 A1* | 5/2010 | Soundararajan | 709/227 |
| 2010/0145536 A1* | 6/2010 | Masters et al. | 700/292 |
| 2011/0126268 A1* | 5/2011 | Youngworth | 726/4 |
| 2011/0145418 A1* | 6/2011 | Pratt et al. | 709/227 |

* cited by examiner

SIMULATION OF MULTIPLE NODES IN AN INTERNETWORK

FIELD OF THE INVENTION

The present disclosure relates to the simulation of multiple network nodes in an internetwork, to enable hardware and/or software components of a network to be tested or demonstrated.

BACKGROUND OF THE INVENTION

In the course of designing a communications or data network, it is advantageous to be able to test components of the network without having to physically build the entire network in order to conduct such tests. For example, a back office system for a network may have been implemented on a relatively small network, e.g. having tens or a few hundreds of nodes. It would be desirable to test the scalability of the back office system to operate on a much larger network, without first incurring the cost to build such a network.

One example of an environment in which such a capability would be useful is an Automated Metering Infrastructure (AMI). These types of systems are implemented with wired or wireless communication networks that enable water, gas, and electric utilities to remotely access consumption information, without requiring personnel in the field to record meter readings. As utilities begin a full-scale roll out of AMI networks, they need to assess the ability of back office systems to effectively communicate with an increasing number of utility meters. For example, a large utility may have over 100 million meters deployed to customers. Each meter constitutes a node in the AMI network. Before expending the costs to replace or re-configure all of these meters to communicate over the AMI network, it would be useful to determine whether back office systems and software impose any constraints on the scalability of the network.

One possible way to test the ability to effectively communicate with a number of nodes is to implement multiple virtual nodes on a computer by sharing the resources of the computer across multiple environments, known as virtualization. One example of a program that supports virtualization is VMware®.

Virtualization could permit a network designer to reduce capital costs by requiring less hardware to test communications with multiple nodes than is required by physically constructing a network with such nodes. Essentially, each node is implemented as a virtual machine, and the back office system can separately communicate with each such virtual machine, to simulate communications with multiple nodes over a network.

Despite the possibility of implementing multiple virtual machines on a single computer using virtualization, there are significant limitations to using this technology to test the ability to communicate with a large number of network nodes. Specifically, each virtual machine is assigned a network address, e.g. an Internet Protocol (IP) address. One possible implementation of virtual machines to simulate network nodes on a computer running a Linux operating system can be configured with a maximum of 4096 network addresses. Accordingly, a computer running a Linux operating system would be limited to a maximum configuration of 4096 virtual nodes.

Likewise, another possible implementation of virtual machines to simulate network nodes on a computer running a Windows® operating system could be configured with a maximum of 256 network addresses. Accordingly, a computer running a Windows operating system would be limited to a maximum configuration of 256 virtual nodes. Since a large network, such as a utility network, could have millions or even hundreds of millions of nodes, the limited capacity of virtualization does not support an effective test of the scalability of the back office system.

Accordingly, it would be highly desirable to conduct a logical test for functional performance in a network with a large number of network nodes with minimal time and resources, as compared to simulation methods that could be developed with virtual machines, to set up and test a one-to-many relationship between a source (e.g. a back office system) and nodes on a network.

SUMMARY

The invention disclosed herein addresses the foregoing limitations of prior art methods for testing the ability to communicate with a large number of endpoint devices on a network. A range of plural network addresses is assigned to a simulation application. Network communications are monitored by the application to identify data packets. Upon detecting a packet have a destination address in the range of assigned network addresses, a command is forwarded to an end-use application and the destination address is stored. A command is processed in the end-use application and a result is returned. A response packet with the result is transmitted, with the stored destination address used as the source of the response packet.

BRIEF DESCRIPTION OF THE FIGURES

Other objects and advantages of the present disclosure will become apparent to those skilled in the art upon reading the following detailed description of exemplary embodiments, in conjunction with the accompanying drawings, in which like reference numerals have been used to designate like elements, and in which.

DETAILED DESCRIPTION

In the following description, for the purpose of explanation and not limitation, certain details are set forth, such as system components and steps, in order to provide a thorough understanding of the present invention. However, it will be apparent to those skilled in the art that the present invention may be practiced in other embodiments that depart from these details. In other instances, detailed descriptions of well-known concepts and methods have been omitted so as not to obscure the description of the present invention.

To facilitate an understanding of the principles upon which the invention is based, exemplary embodiments are described in connection with its implementation in a wireless AMI network for an electric utility. It will be appreciated, however, that the practical applications of the invention are not limited to these examples. Rather, the invention can be used in a variety of wireless and hard-wired network environments. Similarly, the invention can be employed in networks that utilize a range of packet and network protocols, including the IP protocol described in the examples, and non-IP network and packet protocols.

Figure 1:
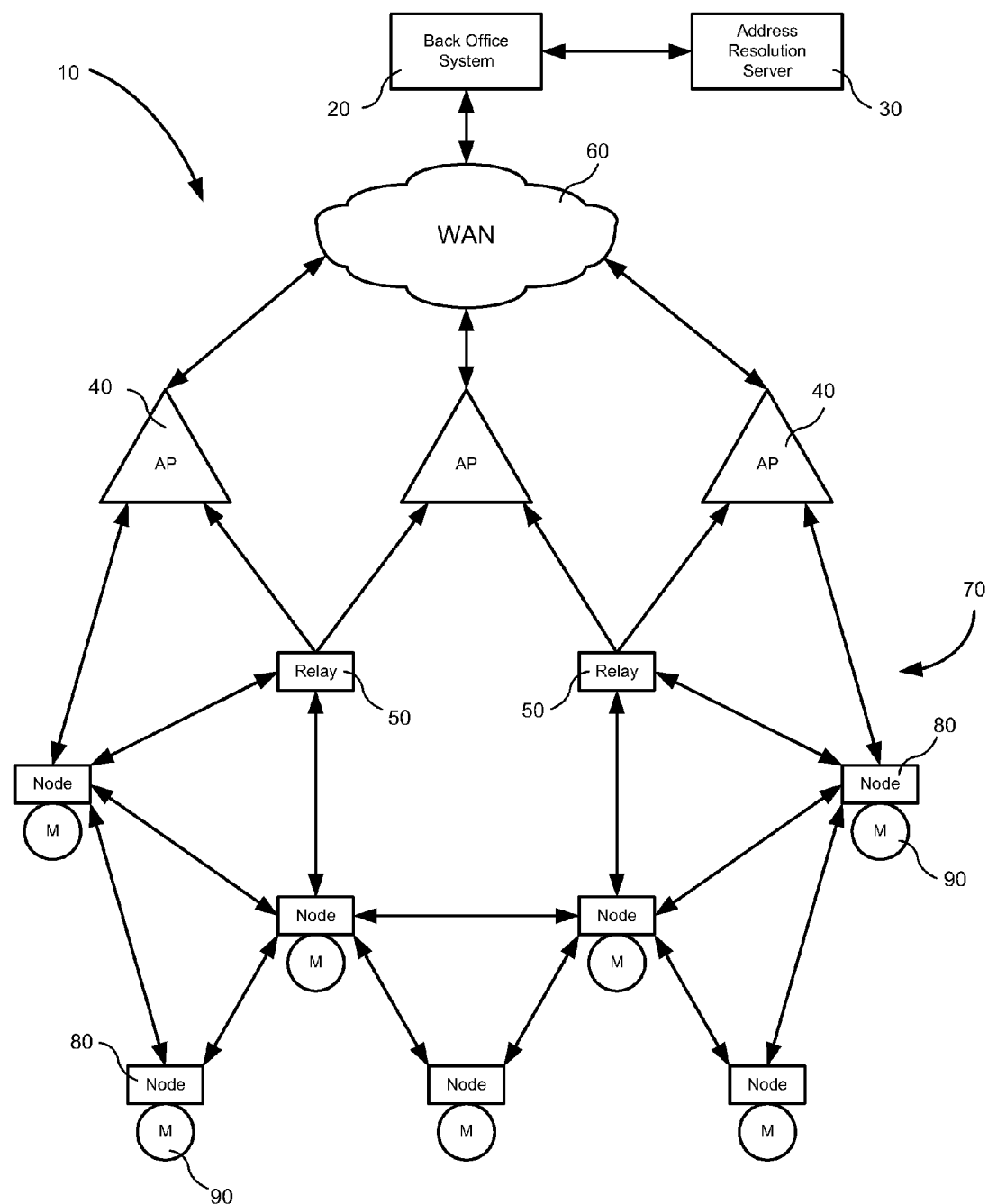
FIG. 1 is a schematic diagram of an exemplary embodiment of an IP internetwork to be simulated.

FIG. 1 illustrates an exemplary embodiment of an internetwork 10. In this embodiment, the internetwork 10 is associated with a utility that provides electric power to its customers' premises. Back office system 20 of the utility may comprise a computer or any number of computing systems. Back office system 20 may communicate with one or more network nodes 90 by means of one or more IP addresses that are assigned to each node. Internetwork 10 may comprise hundreds of thousands to many millions of network nodes 90.

The back office system 20 may receive a command to poll a utility meter 80 that is associated with a network node 90. Upon receiving this command, the back office system 20 sends a lookup request containing the name of the desired meter 80 to an address resolution server 30. In one embodiment, the address resolution server may be a Domain Name Service (DNS) server. In another embodiment, the address resolution server 30 may be based upon a directory server technology, such as an LDAP.

Address resolution server 30 processes the request and returns one of more IP addresses for the network node 90 that is associated with the desired meter. Using one of these returned addresses, the back office system sends IP request packets to one or more access points 40 via a wide area network (WAN) 60. The access points 40 provide an interface between the WAN 60 and a local area network (LAN) 70 that includes the nodes 90. In one exemplary embodiment, the LAN 70 is a wireless network, and the WAN 60 can be either a wired or wireless network. Access points 40 send the request packets to the nodes 90 associated with the respective meters to be polled. The network node 90 associated with a meter 80, hereinafter referred to as a "meter node", may comprise a Network Interface Card ("NIC") 85 which may acquire raw commodity usage data from an associated meter 80 that is associated with a particular IP address. NIC 85 converts the raw data received from meter 80 to digital data in firmware residing in NIC 85. NIC 85 can transmit the digital data to the back office system 20 through one of the access points 40. Communications between the nodes 90 and the access points 40 can be direct, or via other nodes 90, and/or one or more relays 50 and/or eBridges 55.

Figure 2A:
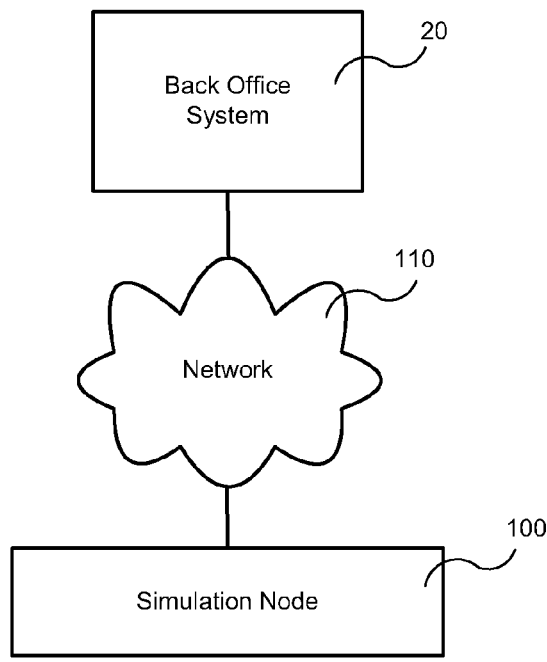
FIGS. 2A and 2B are schematic diagrams of exemplary embodiments of a system that may be used to logically simulate an IP internetwork.
Figure 2B:
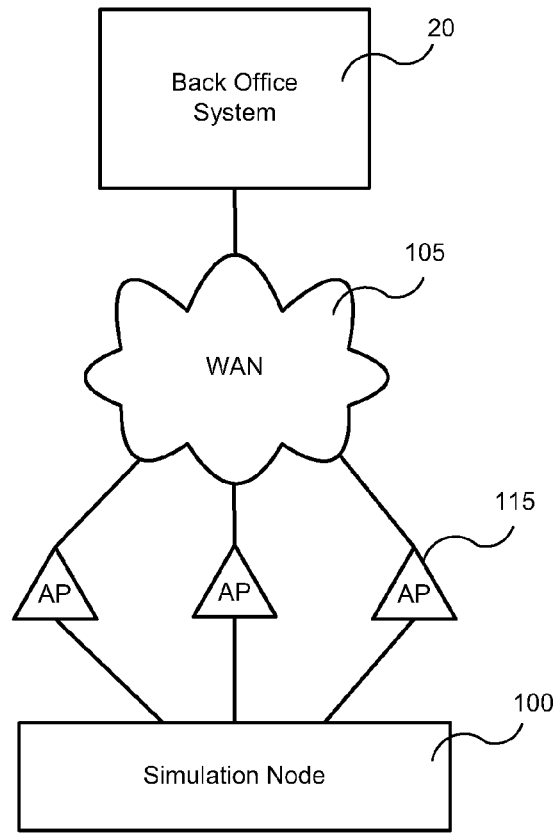

FIGS. 2A and 2B illustrate examples of network configurations that can be employed to simulate a network having a large number of nodes 90 without having to physically build such a network. Referring to FIG. 2A, the back office system 20 communicates with a simulation node 100 via a network 110. In one embodiment, the network 110 can be a local area network, to enable the back office system 20 and the simulation node to both be located within a confined geographic area. To provide a more realistic representation of the conditions that might be encountered in a real-world implementation, the back office system can be connected to the simulation node via a wide area network 105, as illustrated in FIG. 2B. In such a configuration, the simulation node 100 can be connected to the WAN 105 via an access point 115 that corresponds to one of the access points 40 in the internetwork 10 of FIG. 1. In a further embodiment, the simulation node 100 can be connected to the WAN 105 via multiple access points 115, each of which is assigned a different set of addresses, to thereby simulate a larger network.

Figure 3A:
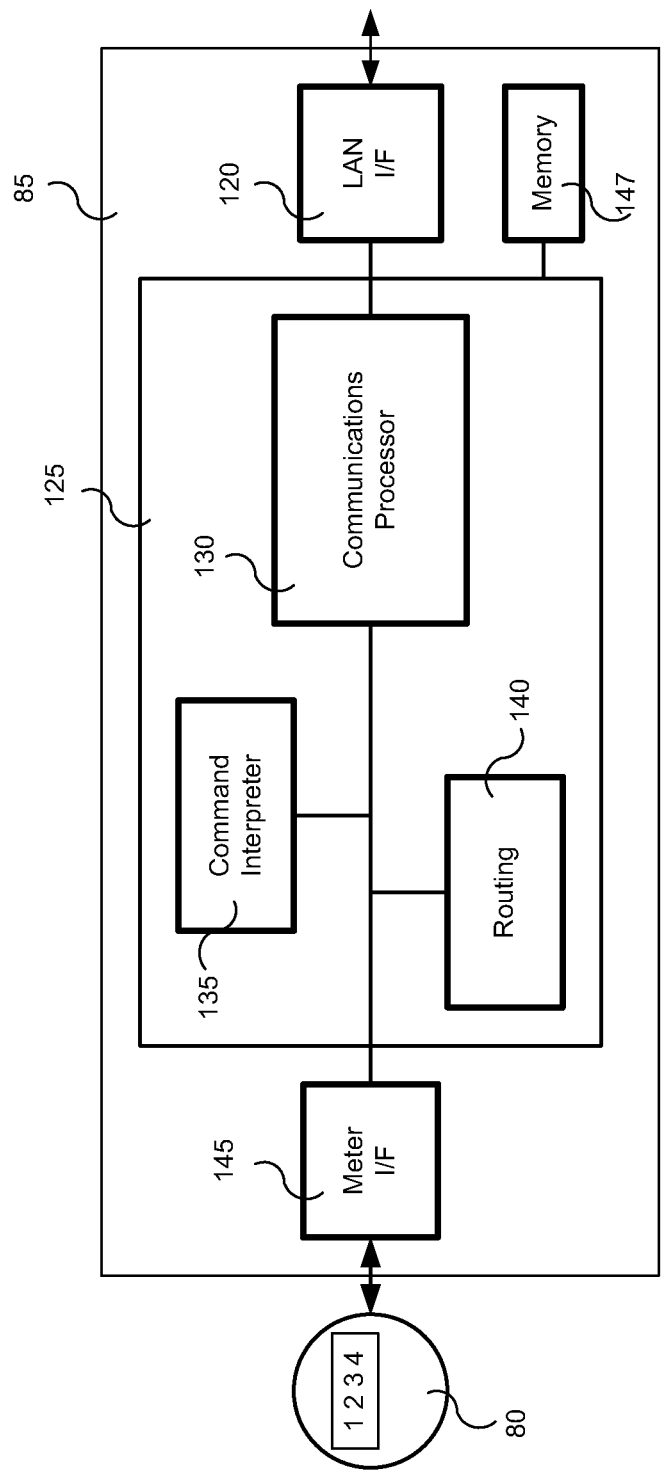
FIG. 3A is a block diagram of one embodiment of a conventional network node.

FIG. 3A illustrates the components of a node. The NIC 85 includes an interface 120 for connection to the LAN 70. In the case of a wireless LAN, for example, the interface includes a transceiver for sending and receiving wireless transmissions via a suitable protocol, e.g. CDMA, FHSS, WiMAX, etc. Alternatively, the interface 120 could be a power-line carrier (PLC) interface, to enable communications to be conducted over electrical power distribution lines.

The NIC includes a central processing unit 125 that implements a number of function modules. One module comprises a communications processor 130. In a receiving mode, the communications processor examines each data packet that is received via the LAN 70, and determines whether the packet is addressed to the node. If so, the communications processor decodes the data packet and forwards the information in its data field, or payload, to a command interpreter 135. If the data packet is not addressed to the node, the communications processor may simply discard the packet. Alternatively, if the node is configured to operate as a relay, it may command the LAN interface 120 to re-transmit the packet so that it can be received by other nodes that may be downstream from the node that is relaying it.

The command interpreter 135 analyzes the data received from the communications processor 130 to determine what action to take. If the data comprises information received from other nodes, the command processor may forward that information to a routing module 140 that processes the data to update the node's routing tables. Alternatively, the received information may be a command from the back office system 20 to obtain data from an end-point device, such as a meter 80. In that case, the command processor sends a command to a device interface 145, requesting the data. When the device returns its reading to the interface 145, the command processor forwards it to the communications processor with an instruction to send a data packet containing the obtained data to the back office server. The communications processor constructs a data packet with a header containing the address of that node as the source address and the address of the back office system as the destination address, and a payload containing the data from the device. This packet is forwarded to the network interface 120 to be transmitted via the LAN 70.

The firmware of the NIC, i.e. the programs executed by the CPU 125 to implement the functions of each of these modules, is stored in a suitable non-volatile memory 147, e.g. flash memory, ROM, EEPROM, etc.

Figures 3B, 3C:
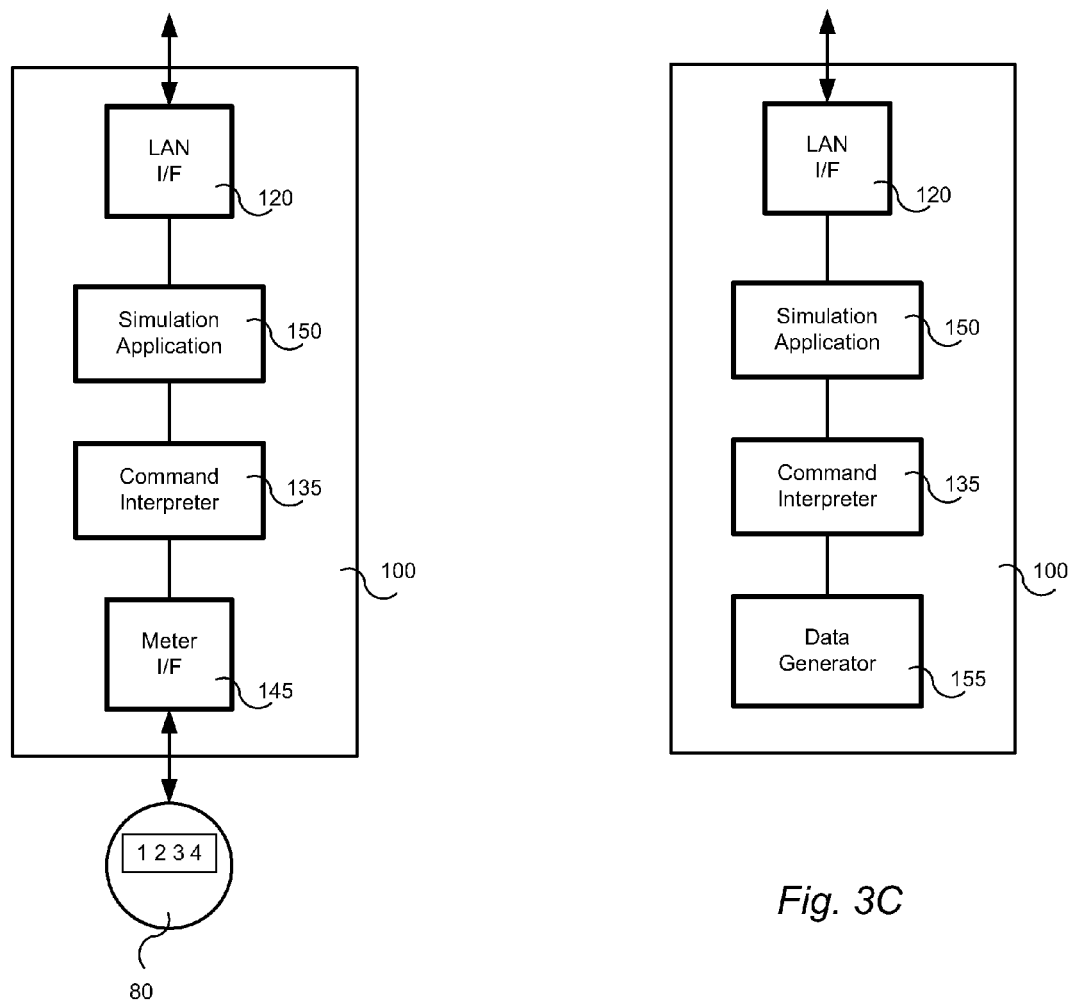
FIGS. 3B and 3C are block diagrams of exemplary embodiments of a simulation node, respectively.

FIG. 3B illustrates the configuration of one embodiment of a simulation node 100. In this embodiment, the simulation node is configured to interface with a physical device, such as a meter or other type of sensor, to return actual readings in response to commands from the back office system. In contrast to the communications processor of a conventional node, however, the simulation node includes a simulation application 150 that is stored in the memory 147 of the node and executed by its CPU 125. This simulation application enables the node to logically appear to be a multitude of nodes within the network. Otherwise, however, the simulation node employs the same firmware as a conventional node to process packets, and thereby provides a realistic response to received packets.

The simulation application 150 residing on the simulation node 100 is assigned a multiplicity of network addresses, such as IP addresses. These assigned addresses serve as logical addresses for simulated network nodes 90. A network address range is defined for each simulation node 150. For example, a set of IP address range elements may be defined by a starting IP address and end at an address defined by counting a predetermined number of IP addresses. The addresses assigned to the simulation application can be in a single contiguous range, or encompass multiple ranges. For example, each range of addresses may have a different respective prefix that is associated with a different one of the access points 115 for the network configuration depicted in FIG. 2B. A multi-range set of address elements can be designated in the following way:

IP_ADDRESS_RANGE_1 = (IP_ADDRESS_START_1, COUNT_1)
IP_ADDRESS_RANGE_2 = (IP_ADDRESS_START_2, COUNT_2)
...
IP_ADDRESS_RANGE_N = (IP_ADDRESS_START_N, COUNT_N).

Alternatively, the set of IP address range elements configured for the simulation application stored and executed in the simulation node 150 may be defined as:

IP_ADDRESS_RANGE_1 = (IP_ADDRESS_START_1, IP_ADDRESS_END_1)
IP_ADDRESS_RANGE_2 = (IP_ADDRESS_START_2, IP_ADDRESS_END_2)
...
IP_ADDRESS_RANGE_N = (IP_ADDRESS_START_N, IP_ADDRESS_END_N).

Figure 4:
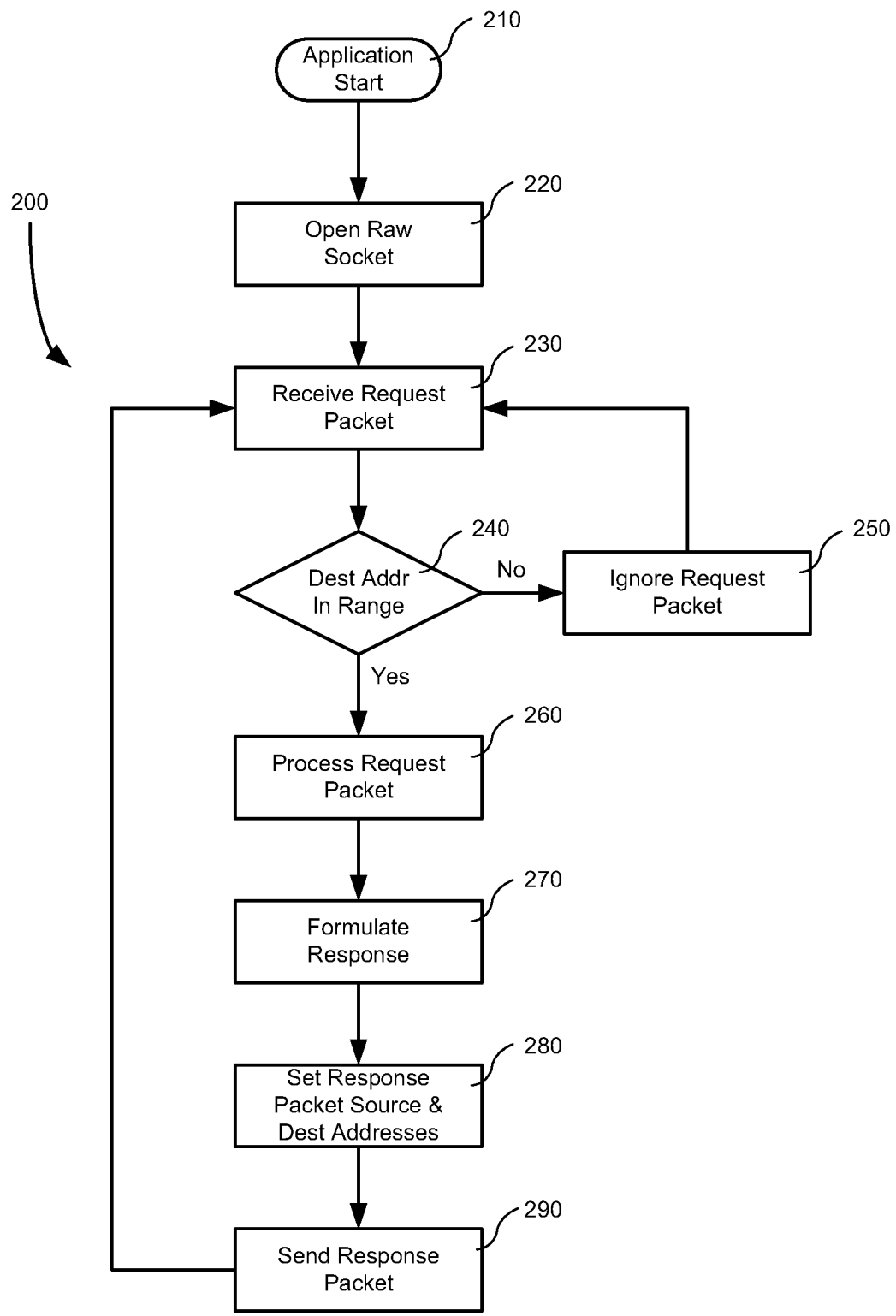
FIG. 4 is a flow chart of a process that a logical simulator executes to process an IP packet.

A flowchart illustrating the operation of the simulation application is shown in FIG. 4. The simulation application 150 is started in the simulation node 100 at step 210. One or more IP address ranges, e.g. IP_ADDRESS_RANGE_1, IP_ADDRESS_RANGE_2, up to IP_ADDRESS_RANGE_N, are loaded into the simulation application executing in simulation node 100.

The simulation application opens a raw socket at step 220. The raw socket allows the simulation application to listen to and process data packets directed to network nodes, regardless of whether the destination address is one of the addresses in the assigned address range set. In other words, once the simulation application has created the raw socket, all data packets received at the simulation node 100 are routed through the operating system of the node 100, into the raw socket, and to the simulation application for processing.

At step 230, a request packet is received by the simulation application 150. In the case where the IP protocol is being used, the request packet comprises a header and a payload. The header comprises a destination IP address and a packet source address, e.g. the address of the back office system. The payload may comprise a command. For example, the command may request data from a device that is associated with the destination address.

Once the request packet is received by the simulation application in simulation node 100, a range test algorithm is performed at step 240. In other words, a network node identification method is carried out. If the destination address in the request packet received by the simulation application is greater than or equal to the start address for one of the address ranges assigned to node 100, and is less than or equal to the ending address for the corresponding range, then the destination address in the request packet received at the node is one of the address range elements. Accordingly, the range test algorithm returns true and proceeds to further process the received packet. Alternatively, at step 250, if the destination address is not one of the range elements, then the range test algorithm returns false and the packet is ignored at node 100. When the result of the determination at step 240 is true, the packet received by node 100 is processed in the normal manner at step 260. For instance, in the example of FIG. 3B, the payload of the received packet is forwarded to the command interpreter 135. In the situation where the simulation application is being used to test the back office system of an AMI network, the payload may contain a command to obtain a meter reading. In that case, the command interpreter sends a command to the meter 80, via the device interface 145, to obtain the requested data. When this data is returned by the meter, it is forwarded to the simulation application 150.

It will be appreciated that the embodiment depicted in FIG. 3B, in which the node 100 simulates a meter node in an AMR network, is exemplary. In practice, the node 100 can be employed in a variety of applications where it is desirable to simulate upward scalability of a network, and the response to a received packet can have many different forms. Thus, the meter 80 could be replaced by any other type of sensor or other end point device that returns a response, e.g. parametric values, status information, etc., upon receipt of an appropriate command.

Upon receiving the requested data, a response packet is formulated at step 270 by the simulation application. The payload of the response packet can be a reply to a back office system command, such as a commodity reading at a utility meter 80, for example. Moreover, the response packet payload could be a utility meter status, for instance, received in reply to a request from the back office system 20.

At step 280, source address of the response packet is set to be equal to the destination address of the request packet received from the back office system 20. In other words, the source address of the outgoing response packet is the network address that was detected at step 240 to be within the range of addresses assigned to the simulation node 100. The destination address of the response packet is set to be the request packet source address, e.g. the back office system. At step 290, the simulation application sends the response packet to back office system 20. Thus, the simulation node 100 logically appears to the back office system as a network node that has the original destination address assigned to it.

In the illustrative example of FIG. 3B, the simulation node 100 is connected to a physical data generating device, to obtain the values that are returned in response to commands in request packets having a destination address within the range(s) of addresses assigned to the node. In an alternative implementation, illustrated in FIG. 3C, connection to a physical device can be replaced by an extended version of the simulation application that includes a module 155 to simulate the operation of the data-generating device. More particularly, the testing of networking capabilities may not require that data representative of real-time physical conditions be returned in response to received commands. Rather, as long as a response packet containing some form of data is set to the back office system, the actual content of the response packet may be irrelevant to the test. In that case, the module 155 that simulates the physical data-generating device could be as simple as a random number generator. Each time a command is received that requires some type of data to be returned, the random number generator can provide a value that is loaded into the data field of a response packet and returned to the requestor. The data can be formatted by the device simulator in accordance with any protocols applicable to the system being simulated. For instance, in the simulation of an AMI network, the simulated meter data can conform to the ANSI C12.19 standard.

In a practical test of the scalability of a network, the back office system may send out the same command to a number of end point nodes in succession. For example, in an AMI network, the back office system may send a command to obtain a meter reading to hundreds or thousands of meters in a batch. In such a case, the simulation node 100 may receive a large number of packets in succession whose respective destination addresses all fall within its assigned range or ranges of addresses. When this occurs, it may not be feasible to prepare and transmit a response to one request packet before one or more succeeding request packets are received that are also within the assigned range(s). Consequently, the simulation application needs to keep track of all of the request packets that are being processed at any given time.

Figure 5A:
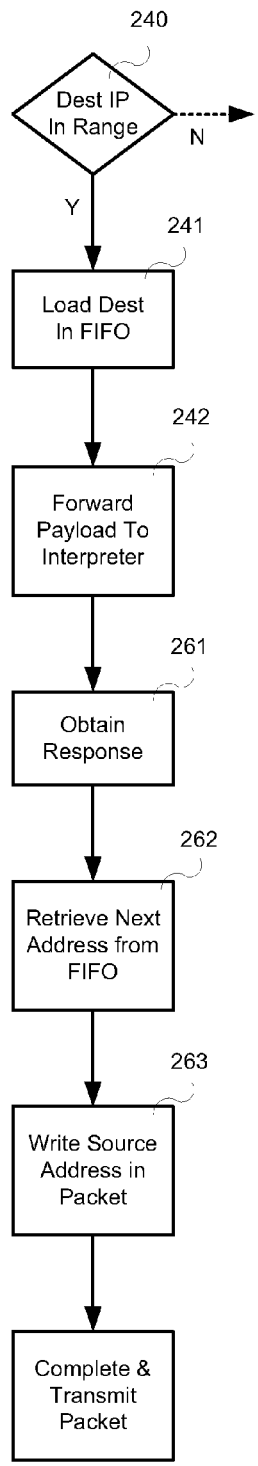
FIGS. 5A and 5B are flow charts of exemplary processes for handling multiple received packets concurrently.

If the request packets are processed in a serial manner, a first-in-first-out (FIFO) buffer can be used to store the destination addresses of the received packets that fall within the assigned range(s) of IP addresses. Referring to the flow chart of FIG. 5A, at step 240 a determination is made whether the destination IP address of a received packet falls within a range of assigned addresses, as in the procedure of FIG. 4. If so, that destination address is loaded into the FIFO buffer at step 241. As each new received packet is received that has a destination address within an assigned range, its destination address is also loaded into the buffer at step 241. The data of the packet is then handed off to be processed, at step 242.

When data responsive to the command in a received request packet is obtained or generated by the simulation application at step 261, an address is retrieved from the buffer at step 262. Since the buffer is a FIFO buffer, the retrieved address is the earliest received address of those stored in the buffer. This retrieved address is then written into the response packet as the source address of that packet at Step 263. The retrieved address is flushed from the FIFO buffer as it is being retrieved, so that when the next set of response data is obtained or generated, the next oldest address stored in the buffer will be retrieved and used as the source address for the response packet containing that data. Thus, the simulation application is able to generate a proper response packet for each received request packet that has an address within its assigned range, even when multiple request packets are received in rapid succession.

In some applications, the processing of the requests may occur asynchronously. For instance, the request packets may contain a variety of different types of commands, some of which can be processed faster than others. In the case of a meter, for example, a command to provide a current reading might result in an instantaneous response, whereas a command to provide the hourly rate of consumption for the previous day may require some data processing before a response can be formulated. In these situations, the responses may not be returned in the same order in which the request packets were received. To accommodate this possibility, the simulation application can use a dynamic address table in place of the FIFO buffer.

Figure 5B:
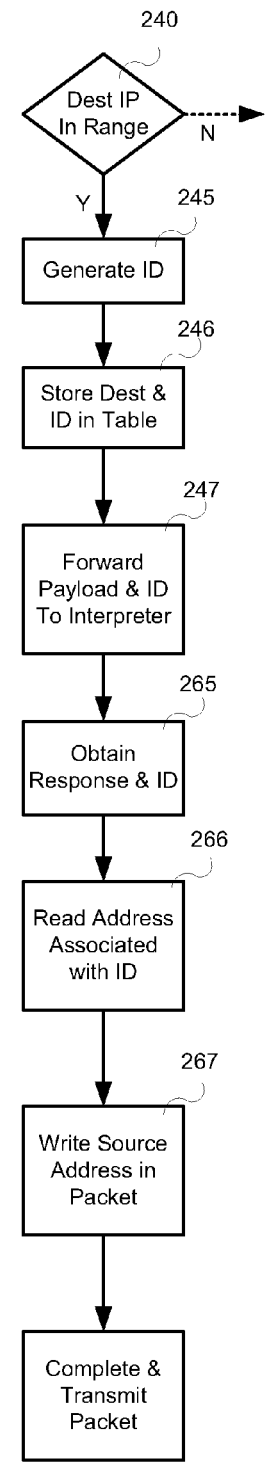

Referring to FIG. 5B, when a determination is made at step 240 that a received data packet has a destination within an assigned range of the simulation node, an identifier is generated at step 245. The identifier could be, for example, an index value that is incrementally increased for each received packet within the assigned address range. At step 246, the destination address of the packet is stored in a table, in association with the identifier. The command in the received data packet is forwarded for processing at step 247, together with the identifier.

When a result is returned at step 265, it is accompanied by the identifier. At step 266, the simulation application uses the identifier to read the associated IP address from the table. This IP address is then written into the source address field of the response packet, and the returned result is written into its payload field at step 267. The address of the back office system is used as the destination address for the response packet, which is then transmitted via the LAN.

In summary, the invention disclosed herein may be employed to test the scalability of any type of network comprising a large number of network nodes. There may be hundreds of thousands, to millions, and even billions of network nodes. To conduct a logical test of the simulated internetwork of network nodes, the method depicted in FIG. 4 may be followed. A logical test of any number of network nodes can be performed with minimal cost and network resources, in accordance with the number of IP addresses assigned to the simulation node.

What is claimed is:

1. A method of simulating communications with a plurality of network nodes comprising:
    assigning a contiguous range of plural network addresses to a simulation node on a network that respectively correspond to a plurality of simulated nodes on the network;
    monitoring communications on the network at said simulation node to detect data packets;
    determining whether a detected data packet has a destination address within the assigned contiguous range of network addresses;
    in response to a determination that the destination address of a detected packet is within the assigned contiguous range, processing a command in said packet and returning a result;
    storing the destination address of a detected packet that is within the assigned contiguous range in a first-in first-out buffer while said command is being processed; and
    when the result is returned, retrieving the stored address sequentially in the order in which the detected packets were received; and
    transmitting a response packet having said result with the destination address of the detected packet as the source address of said response packet.

2. The method according to claim 1, wherein said network is a wireless network.

3. The method according to claim 1, wherein said result is provided by a device connected to the simulation node.

4. The method according to claim 3, wherein said device is a meter.

5. The method according to claim 3, said command comprises a request for information from said device.

6. The method according to claim 1, wherein said command instructs said device to perform a function.

7. The method according to claim 1, wherein said network comprises plural access points with which said simulation node communicates.

8. The method of claim 1, wherein said result is provided by a random number generator.

9. The method of claim 1, wherein said addresses are Internet Protocol (IP) addresses.

10. The method of claim 1, wherein the command is a command to poll a utility meter.

11. A method of simulating communications with a plurality of network nodes comprising:
    assigning a contiguous range of plural network addresses to a simulation node on a network that respectively correspond to a plurality of simulated nodes on the network;
    monitoring communications on the network at said simulation node to detect data packets;
    determining whether a detected data packet has a destination address within the assigned contiguous range of network addresses;

in response to a determination that the destination address of a detected packet is within the assigned contiguous range, processing a command in said packet and returning a result;

storing the destination address of a detected packet that is within the assigned contiguous range while said command is being processed;

retrieving the stored address when the result is returned; and transmitting a response packet having said result with the destination address of the detected packet as the source address of said response packet, wherein each destination address is stored with a corresponding identifier and the identifier is returned with the result, and wherein the identifier is used to retrieve the stored address that is associated with the result.

12. The method of claim 11, wherein the command is a command to poll a utility meter.

13. The method of claim 11, wherein said result is provided by a device connected to the simulation node.

14. A network node that simulates a plurality of nodes, comprising:

a network interface for receiving data packets transmitted via a network;

a processor; and a memory having stored therein a simulation application and a contiguous range of plural network addresses that respectively correspond to a plurality of simulated nodes on the network, wherein said simulation application, when executed by said processor:

examines data packets received by said interface to determine whether they contain a destination address that is within said contiguous range of network addresses, causes a command, which is contained in a received data packet having a destination address within said contiguous range, to be processed, obtains a result from the processing of the command and formulates a response packet having a source address that is the same as the destination address of the received data packet, stores the destination address of a detected packet that is within the assigned contiguous range in a first-in first-out buffer while said command is being processed, when the result is returned, retrieves the stored address sequentially in the order in which the detected packets were received, and causes the network interface to transmit the response packet via the network.

15. The network node of claim 14, wherein said result is provided by a device connected to the simulation node.

16. The network node of claim 15, wherein said command comprises a request for information from said device.

17. The network node of claim 14, wherein the command is a command to poll a utility meter.

18. A network node that simulates a plurality of nodes, comprising:

a network interface for receiving data packets transmitted via a network;

a processor; and a memory having stored therein a simulation application and a contiguous range of plural network addresses that respectively correspond to a plurality of simulated nodes on the network, wherein said simulation application, when executed by said processor:

examines data packets received by said interface to determine whether they contain a destination address that is within said contiguous range of network addresses, causes a command, which is contained in a received data packet having a destination address within said contiguous range, to be processed, obtains a result from the processing of the command and formulates a response packet having a source address that is the same as the destination address of the received data packet, stores the destination address of a detected packet that is within the assigned contiguous range while said command is being processed, retrieves the stored address when the result is returned, and causes the network interface to transmit the response packet via the network, wherein each destination address is stored with a corresponding identifier and the identifier is returned with the result, and wherein the identifier is used to retrieve the stored address that is associated with the result.

19. The network node of claim 18, wherein the command is a command to poll a utility meter.

20. The network node of claim 18, wherein said result is provided by a device connected to the simulation node.

* * * * *